Figure 1:
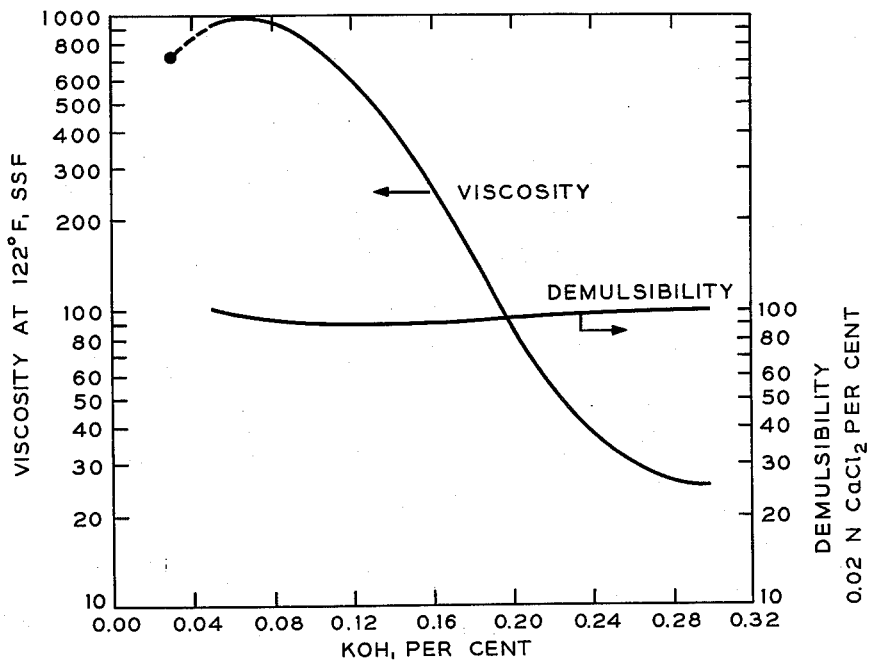

INVENTOR
EDWARD W. MERTENS

July 18, 1961 E. W. MERTENS 2,993,004
ASPHALT EMULSION
Filed Sept. 25, 1957 2 Sheets-Sheet 2

INVENTOR
EDWARD W. MERTENS
BY
ATTORNEYS

United States Patent Office 2,993,004
Patented July 18, 1961

2,993,004
ASPHALT EMULSION
Edward W. Mertens, El Cerrito, Calif., assignor to California Research Corporation, San Francisco, Calif., a corporation of Delaware
Filed Sept. 25, 1957, Ser. No. 686,195
2 Claims. (Cl. 252—311.5)

This invention relates to a new and improved asphalt emulsion. More particularly, the invention is concerned with high residue anionic asphalt emulsions having improved viscosity characteristics.

Asphalt, or bitumen as it is also called, is useful in a wide variety of applications. Illustrative applications include its use in the paving of road surfaces, waterproof coatings and protective coatings in general, as well as the impregnation of fiber-containing material such as paper or felt.

Generally speaking, asphalt is employed in applications of the above type mainly in three forms of liquids. In perhaps its oldest form it is melted by heating and applied as a molten mass. It is also combined with a volatile organic solvents to provide liquid solutions of desired viscosity known as "cut-back" asphalts. Asphalt is also emulsified with water and used in the form of liquid asphalt emulsions. This last form, to which the present invention relates, has several advantages over molten asphalt and cut-back formulations. The asphalt is maintained in liquid form during application without the need for expensive heating equipment and at the same time the high cost and fire hazards involved in the use of organic solvent are avoided.

Asphalt emulsions are usually prepared by mixing the asphalt with an aqueous solution of an alkali metal hydroxide such as sodium or potassium hydroxide to saponify certain high molecular weight carboxylic acids in the asphalt. Such acids may occur naturally in the asphalt or they may be added where the natural acid content is unsatisfactorily low. The soaps thus formed serve as emulsifying agents to produce asphalt emulsions when the asphalt and water of the aqueous solution are mixed together. These asphalt emulsions are classified as anionic in nature because the alkali metal soap emulsifying agents bear a negative charge and are attracted to the anode or positive pole in solution.

A number of special properties are desirable in the so-called quick breaking asphalt emulsions of the present type. One of the most important and fundamental properties is a low viscosity in combination with a high residue. Since asphalt emulsions are usually applied by machinery, it is important that the emulsion flows freely. Low viscosity emulsions are also usually more penetrating and, therefore, more effective in the usual coating and impregnating applications. It is particularly desirable that a high residue be maintained where possible along with the low viscosity of the asphalt emulsion in order to avoid the necessity for handling unduly large amounts of emulsion in a given application. The stabilities of asphalt emulsions are also important factors because it is highly desirable that separation of the asphalt and aqueous phases and increased viscosities be avoided when the emulsions are allowed to stand as during storage. At the same time, it is essential that the emulsion separate rapidly on contact with the material to be coated or impregnated such as aggregate, felt and paper. Suitable asphalt emulsions should likewise quickly demulsify in the presence of electrolytes such as calcium chloride.

It has now been found that a greatly improved high residue asphalt emulsion of low viscosity is obtained in the composition comprising an anionic asphalt emulsion and from 0.05 to 2.0 percent by weight of polyethylene glycol tertiary alkyl thioether having from 5 to 10 polyethylene glycol units and form 8 to 18 carbon atoms in the tertiary alkyl group.

The superior new asphalt emulsions of the invention possess remarkably low viscosities compared to similar emulsions which do not contain the polyglycol alkyl thioether. The emulsions are characterized by surprisingly high residues considering the low viscosities. These important properties permit the most effective utilization of the emulsions in coating and impregnating applications. The emulsions also have excellent stability under storage conditions and do not increase unduly in viscosity or separate on standing. Their demulsibility and quick breaking properties are also outstanding.

According to the present invention, suitable anionic asphalt emulsions are prepared by mixing hot molten asphalt with a hot aqueous solution of an alkali metal hydroxide having a concentration within the range of from about 0.01 to about 2.0 percent by weight alkali metal hydroxide. For present purposes, potassium hydroxide, particularly in concentrations of 0.05 to 0.30, is preferred. Usually from 40 to 80% of asphalt is employed with from 20 to 60% of water.

The polyethylene glycol alkyl thioether is employed in the anionic asphalt emulsion of the invention in any proportion sufficient to lower the viscosity of the emulsion. Preferably from about 0.05 to about 2.0 percent by weight is used based on the total emulsion. The polyglycol thioether may be added to either the aqueous metal hydroxide solution or the asphalt prior to mixing. It may also be added to the anionic asphalt emulsions after they are formed. However, the most effective reduction in viscosity is obtained by adding the polyglycol alkyl thioether to the aqueous alkali metal hydroxide solution prior to mixing with the asphalt.

Suitable polyglycol alkyl thioethers contain from 5 to 10 polyethylene glycol units and from 8 to 18 carbon atoms in the tertiary alkyl group, as mentioned above. They are illustrated by the formula $H(OCH_2CH_2)_nSR$, wherein $n$ is the number of glycol units, S is sulfur and R is representative of the alkyl group. Illustrative polyglycol alkyl thioether compounds include heptaethylene glycol tertiary octyl thioether, hexaethylene glycol tertiary octyl thioether, decaethyleneglycol tertiary octadecyl thioether, etc. Presently preferred are the polyethylene glycol tertiary alkyl thioethers containing an average of from 6 to 8 polyethylene glycol units and from 10 to 15 carbon atoms in the tertiary alkyl group.

A wide variety of asphalts are suitable in the preparation of the superior new asphalt emulsion according to this invention. Asphalts which normally contain sufficient high molecular weight carboxylic acids to provide emulsions upon saponification of the acids with aqueous alkali metal hydroxide solutions are preferred. It is possible, however, to increase or decrease the amount of high molecular weight carboxylic acid in the asphalt and provide more or less saponified carboxylic acid emulsifying agent where that is desirable.

In a typical preparation, the aqueous alkali metal hydroxide emulsifying base is mixed with the asphalt at a temperature in the range of from about 120 to 180° F. Where colloid mills are employed the temperatures may be raised to 300° F. or more. It is essential that the asphalt be in a molten state prior to mixing. Usually, temperatures of around 300° F. are sufficient but the exact temperature will depend on the softening point of the particular asphalt employed in preparing the emulsion.

In a further illustration of the greatly improved high residue anionic asphalt emulsions of the invention, a series of emulsions was prepared and tested, as outlined in the following paragraphs.

All of the emulsions were prepared in 2,500 gm. quantities in a steam heated, stainless steel vessel equipped with a 1,725 r.p.m. stirrer, temperature gauge, condenser and electrically heated asphalt reservoir. The aqueous phase consisting of distilled water, alkali metal hydroxide and the specified polyethylene glycol alkyl thioether is made up in the vessel and brought to a temperature of 160° F. with continuous stirring. Simultaneously, the aqueous phase is put into the asphalt reservoir and brought to a temperature of 250° F. When both the aqueous and asphalt phases are at the desired temperatures, the asphalt is added to the aqueous phase over a three-minute period. Following an additional 30 seconds stirring period, the emulsion is withdrawn into a one-gallon glass jar. The glass jar is covered and placed in a 120° F. oven for over-night storage prior to testing.

The asphalt employed in the tests was a typical Venezuelan asphalt of 200 to 250 penetration. The emulsions were formulated with 57% by weight asphalt, potassium hydroxide, polyethylene glycol tertiary alkyl thioether and the balance water, as indicated in the table below.

The viscosity in seconds Saybolt Furol for 60 mls. at 122° F. and the demulsibility were determined according to the "Standard Methods of Testing Emulsified Asphalts," ASTM designation D-244-55. The demulsibility of a particular emulsion is the percentage by weight of the asphalt present that fails to pass a No. 14 wire cloth when a 100 gm. sample of the emulsion is mixed with 35 mls. of 0.02 N calcium chloride solution. The residue test determines the percent by weight of residue which remains after a 25 gm. sample of the emulsion is heated until all of the water is evaporated. The polyethylene glycol tertiary alkyl thioether employed in the test was one containing an average of 6 to 8 polyethylene glycol units and a tertiary dodecyl alkyl group. This material is known to the trade by the name "Nonic 218" and is manufactured by Sharples Chemical Company.

Table

| Variable Components | | Properties | | | | | | |
|---|---|---|---|---|---|---|---|---|
| Polyglycol Alkyl Thioether, Percent | KOH, Percent | Viscosity, SSF, at 122° F. | Demulsibility (0.02 N CaCl$_2$) | Residue, Percent | Particle Size ($\mu$) | | Storage Stability, 1 Week at 160° F. | |
| | | | | | Range | Predominant | Viscosity | Demulsibility, Percent |
| 0.00 | 0.03 | Broke on overnight storage. | | | | | | |
| 0.00 | 0.04 | Do. | | | | | | |
| 0.00 | 0.05 | 912 | 100 | 56.8 | 1-6 | 3.5 | Extensive skinning. | |
| 0.00 | 0.06 | 966 | 99 | 57.6 | 1-6 | 3.5 | Tests not feasible. | |
| 0.00 | 0.09 | 372 | 90 | 56.8 | 1-6 | 2.5 | | |
| 0.00 | 0.12 | 658 | 90 | 56.8 | 1-4.5 | 3 | | |
| 0.00 | 0.15 | 349 | 93 | 56.8 | 1-4.5 | 2.5 | | |
| 0.00 | 0.18 | 88 | 92 | 56.4 | 1-4 | 2.5 | | |
| 0.00 | 0.21 | 119 | 95 | 56.8 | 1-4 | 3 | | |
| 0.00 | 0.24 | 39 | 98 | 56.4 | 0.5-4 | 2 | | |
| 0.00 | 0.27 | 28 | 97 | 56.8 | 0.5-4 | 2 | | |
| 0.00 | 0.30 | 26 | 97 | 56.8 | 0.5-4 | 2 | | |
| 0.0 | 0.06 | 870 | 97 | 57.6 | 0.5-15 | 5 | 1,250 | 100 |
| 0.025 | 0.06 | 931 | 97 | 56.8 | 0.5-12 | 4 | 884 | 100 |
| 0.05 | 0.06 | 895 | 98 | 56.4 | 0.5-10 | 4 | 945 | 100 |
| 0.075 | 0.06 | 881 | 97 | 56.8 | 0.5-10 | 3 | 737 | 100 |
| 0.25 | 0.06 | 225 | 83 | 56.8 | 0.5-7 | 2.5 | 205 | 90 |
| 0.35 | 0.06 | 119 | 74 | 58.0 | 0.5-6 | 2.5 | 102 | 77 |
| 0.50 | 0.06 | 77 | 59 | 58.0 | 0.5-6 | 2 | 38 | 58 |
| 0.75 | 0.06 | 54 | 45 | 57.2 | 0.5-5 | 1.5 | 23 | 28 |
| 1.00 | 0.06 | 22 | 21 | 56.4 | 0.5-3 | 1.0 | 18 | 3.5 |
| 0.0 | 0.18 | 440 | 99 | 56.8 | 1-6 | 4 | 99 | 98 |
| 0.025 | 0.18 | 625 | 99 | 56.4 | 1-6 | 4 | 105 | 98 |
| 0.05 | 0.18 | 636 | 97 | 56.8 | 1-8 | 4 | 184 | 98 |
| 0.075 | 0.18 | 271 | 99 | 55.6 | 1-9 | 3 | 28 | 93 |
| 0.10 | 0.18 | 274 | 97 | 56.8 | 1-4 | 3 | 88 | 94 |
| 0.15 | 0.18 | 130 | 94 | 56.8 | 1-6 | 3 | 49 | 93 |
| 0.20 | 0.18 | 214 | 95 | 57.2 | 1-5 | 2 | 76 | 94 |
| 0.40 | 0.18 | 62 | 79 | 56.8 | 1-4 | 2 | 30 | 74 |
| 0.50 | 0.18 | 35 | 56 | 57.2 | 0.5-4 | 1 | 11 | 51 |
| 0.75 | 0.18 | 26 | 56 | 57.2 | 0.5-3 | 1 | 16 | 35 |
| 1.00 | 0.18 | 23 | 10 | 57.2 | 0.5-3 | 1 | 15 | 7 |
| 0.0 | 0.24 | 149 | 97 | 60.4 | 1-8 | 2 | 255 | 93 |
| 0.025 | 0.24 | 336 | 97 | 56.8 | 1-7 | 2 | 288 | 99 |
| 0.05 | 0.24 | 292 | 95 | 57.6 | 1-5 | 1.5 | 288 | 94 |
| 0.075 | 0.24 | 134 | 93 | 57.2 | 1-4 | 1.5 | 73 | 94 |
| 0.15 | 0.24 | 58 | 94 | 57.2 | 1-4 | 1.0 | Broken | Broken |

The above test results show that the surprisingly improved anionic asphalt emulsions containing polygylcol alkyl thioether in accordance with the invention have much lower viscosities than corresponding emulsions which contain no polygylcol alkyl thioether. The emulsions according to the present invention are also seen to have unusually high residues considering the low viscosities. The combination of these two important properties in the emulsions of the invention means that they are most effective in coating and impregnating applications. Another superior characteristic of the present emulsions which is apparent from the above test results resides in the excellent stability of the emulsions under the usual high temperature (120° F. and above) storage conditions. There is little or no increase in the viscosity of the emulsion on standing. Furthermore, it is seen that the emulsions do not tend to separate when allowed to stand for considerable periods of time.

Figure 2:
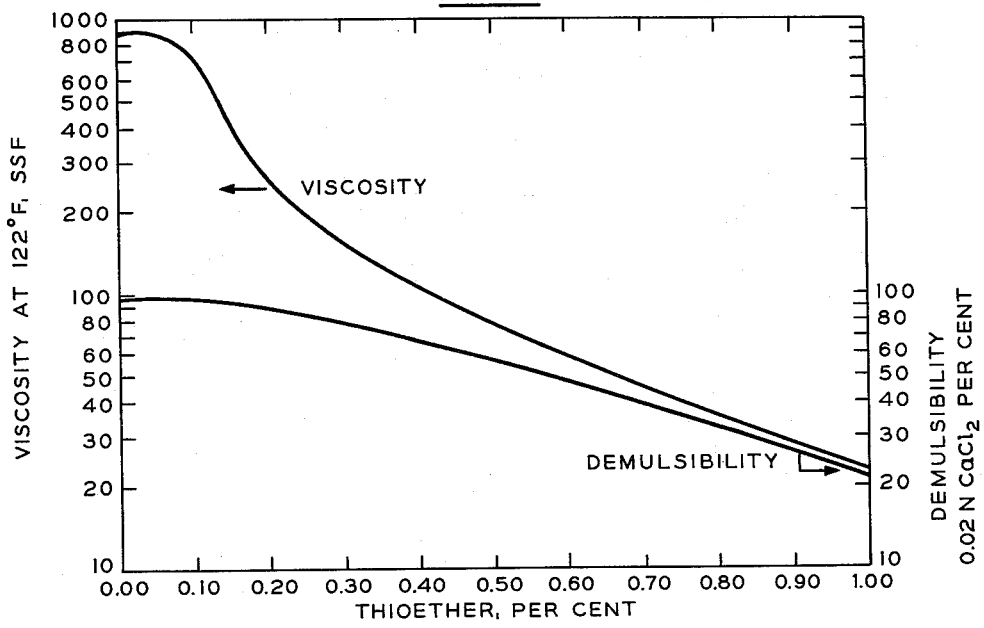
Figure 3:
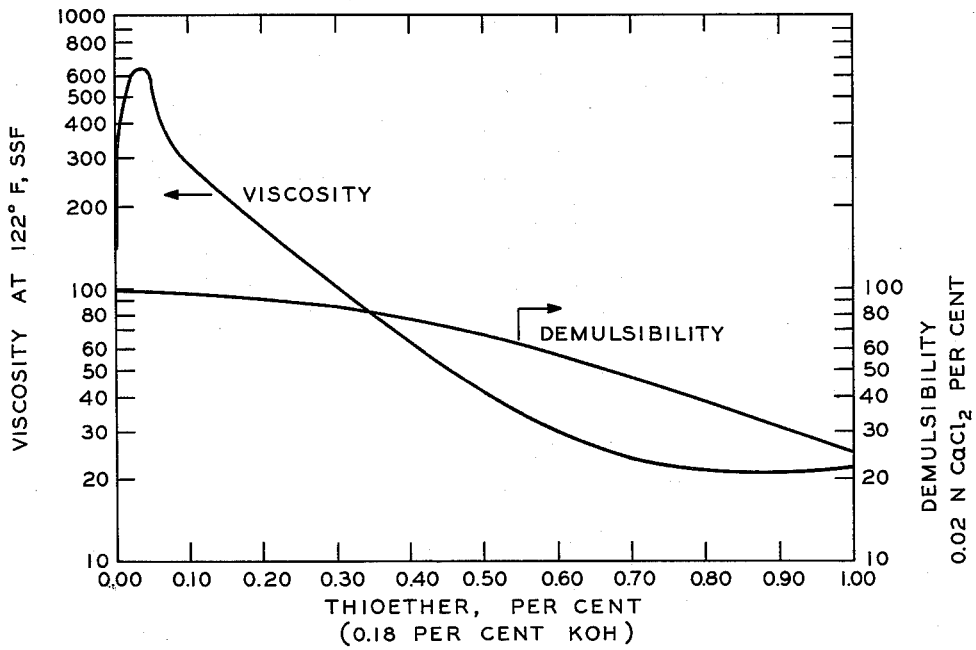
Figure 4:
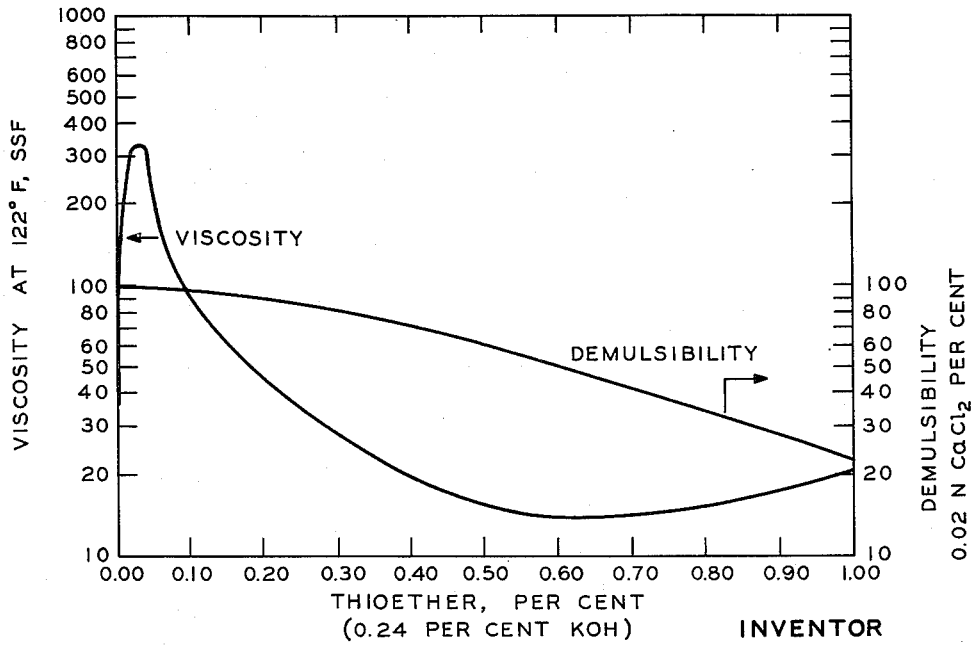

In further illustration of the superior new anionic asphalt emulsions of the invention, the above test data has been plotted to give the graphs in FIGURES 1 to 4, inclusive, of the accompanying drawing. In FIGURE 1 is shown the effect of alkali metal hydroxide (KOH) content on the properties of the asphalt emulsions. Although the viscosity of the emulsions falls off at increased alkali metal hydroxide concentrations, it must be kept in mind that such high alkali metal hydroxide containing emulsions are very unstable in storage as indicated in the above table of test results. FIGURES 2, 3 and 4 all provide a visual appreciation of the effect of polyglycol alkyl thioether on typical anionic asphalt emulsions. The graphs in these figures show that when the polyglycol alkyl thioether is employed in the specified proportions according to the present invention, a remarkable improvement in viscosity is obtained throughout a broad range of alkali metal hydroxide employed in the asphalt emulsion. The improved anionic asphalt emulsions not only have desirably low viscosities but also possess excellent demulsibility characteristics.

I claim:

1. An improved high residue asphalt emulsion of low viscosity consisting essentially of an anionic soap asphalt emulsion and from 0.05 to 2.0 percent by weight of polyethylene glycol tertiary alkyl thioether having from 5 to 10 polyethylene glycol units and from 8 to 18 carbon atoms in the tertiary alkyl group, said thioether being sufficient to lower the viscosity of the emulsion and said anionic soap asphalt emulsion being prepared by mixing from 40 to 80 percent by weight of molten asphalt with from 20 to 60 percent by weight of aqueous solution of from about 0.05 to about 0.30 percent by weight of potassium hydroxide so as to saponify high molecular carboxylic acids in the asphalt, the aforesaid proportions being based on the total asphalt emulsion.

2. An improved high residue asphalt emulsion of low viscosity consisting essentially of an anionic soap asphalt emulsion and from 0.05 to 2.0 percent by weight of polyethylene glycol tertiary alkyl thioether having an average of 6 to 8 polyethylene glycol units and a tertiary dodecyl alkyl group, said thioether being sufficient to lower the viscosity of the emulsion and said anionic soap asphalt emulsion being prepared by mixing from 40 to 80 percent by weight of molten asphalt with from 20 to 60 percent by weight of aqueous solution of from about 0.05 to about 0.30 percent by weight of potassium hydroxide so as to saponify high molecular weight carboxylic acids in the asphalt, the aforesaid proportions being based on the total asphalt emulsion.

References Cited in the file of this patent

UNITED STATES PATENTS

| | | |
|---|---|---|
| 2,565,986 | Olin | Aug. 28, 1951 |
| 2,635,055 | Figdor | Apr. 15, 1953 |
| 2,706,688 | Sommer et al. | Apr. 19, 1955 |
| 2,789,917 | Hardman et al. | Apr. 23, 1957 |

OTHER REFERENCES

The American Perfumer and Essential Oil Review, article by Griffin; May 1955, pp. 26–29.

Atlas Guide to the Use of Sorbitol and Surfactants in Cosmetics; pub. by Atlas Powder Co. (1956), p. 31.